United States Patent [19]

Krieg

[11] 4,401,256

[45] Aug. 30, 1983

[54] LAMINAR THERMOPLASTIC FILMS, BAGS THEREOF

[75] Inventor: Donald J. Krieg, Fairport, N.Y.

[73] Assignee: Mobil Oil Corporation, New York, N.Y.

[21] Appl. No.: 329,478

[22] Filed: Dec. 10, 1981

[51] Int. Cl.³ ............................................. B65D 30/00
[52] U.S. Cl. ....................................... 229/53; 428/35; 428/349; 428/475.8; 428/476.1; 428/523
[58] Field of Search .................. 428/349, 474.4, 475.5, 428/475.8, 35, 347, 500, 523, 476.1; 229/53

[56] References Cited

U.S. PATENT DOCUMENTS

| | | | |
|---|---|---|---|
| 3,264,272 | 8/1966 | Rees | 156/332 |
| 3,496,061 | 2/1970 | Freshour | 428/513 |
| 3,697,368 | 10/1972 | Bhuta et al. | 428/476.1 |
| 3,791,915 | 2/1974 | Goehring et al. | 156/244.14 |
| 3,819,792 | 6/1974 | Ono et al. | 264/209.8 |
| 4,220,684 | 9/1980 | Olson | 428/35 |
| 4,301,216 | 11/1981 | Grant | 428/475.8 |
| 4,302,511 | 11/1981 | Tuller et al. | 428/35 |

FOREIGN PATENT DOCUMENTS 2045774 11/1980 United Kingdom ............. 428/475.8

*Primary Examiner*—George F. Lesmes
*Assistant Examiner*—E. Rollins Buffalow
*Attorney, Agent, or Firm*—Charles A. Huggett; James F. Powers, Jr.; James P. O'Sullivan, Sr.

[57] ABSTRACT

A heat sealable film laminate having a first layer of a major amount of high density polyolefin, a minor proportion of an adhesion promoting ionomer and a heat seal promoting proportion of a metal salt of a fatty acid; and a second layer adhering to the first layer, said layer comprising a polyamide. A food storage and heating bag formed from said laminate and a method of heat sealing said laminate.

26 Claims, No Drawings

LAMINAR THERMOPLASTIC FILMS, BAGS THEREOF

BACKGROUND OF THE INVENTION

The present invention relates to coextruded laminar thermoplastic films and bag structures formed therefrom. The invention further relates to laminar film structures comprising two layers of films which are formed from dissimilar thermoplastic resins. The invention also relates to a method of improving the heat seal between face to face layers of the same layer of the laminar structure.

DESCRIPTION OF THE PRIOR ART

Previously, polyethylene bags have been employed for the storage of food in its refrigerated condition. This type of container or bag is particularly convenient for the keeping of food leftovers which are intended for later reheating. The storage bags have been formed from comparatively low density polyethylene, i.e., polyethylene having a density from about 0.910 to about 0.930 g/cc. Bags made from such low density polyethylene do not have utility for holding food or leftovers during heating because the polyethylene cannot stand cooking temperatures on the order of 215° F. or greater. Even at temperatures below this, the polyethylene has a tendency to at least partially melt and adhere to the surface of the heating means or vessel.

Attempts have been made to employ polyester bags, such as polyethylene terephthalate for such elevated temperature applications, however, such films are difficult to seal and are prohibitively expensive for such disposable bag applications.

It has been known in the past that laminar film for food packaging may be formed from a laminate of nylon and polyethylene provided that an adhesive inner layer is provided between the polyethylene and the nylon. Such a construction involves a three layer structure and as such presents manufacturing difficulties including the employment of three separate extruders in the manufacturing operation to produce a single film. The elimination of the intermediate adhesive layer of such a structure is addressed in U.S. Pat. No. 4,220,664, incorporated herein by reference in its entirety. While the bag structure described in this patent is effective as a container which can withstand the temperature of cooking or reheating, the efficacy of the bag seal regions leaves something to be desired. U.S. Pat. No. 3,819,792 to Ono et al is directed to a process for blow molding a laminar layer structure composed of a layer of a polyamide and a layer of homopolymer or copolymer of an olefin and an ethylene/alpha, beta unsaturated carboxylic acid copolymer. This patent is not concerned with composites of improved heat sealability.

SUMMARY OF THE INVENTION

The present invention provides for an economical thermoplastic laminar film system, which has a variety of uses, but which is particularly well adapted to be formed into bag structures employed to contain food during storage. The same bag may be used during cooking or reheating preparatory to serving. The present invention also provides for an improved method of heat sealing the surfaces or the edges of the subject laminar film structure.

The heat sealable film laminate of the present invention comprises a two layer laminar structure comprising a first layer which comprises a high density polyolefin containing a minor amount of an adhesion promoting ionomer and a heat seal promoting proportion of a metal salt of a fatty acid; and a second layer adhering to said first layer wherein the second layer comprises a polyamide. The high density polyolefin has a density of from about 0.930 to about 0.960 g/cc. The high density polyolefin is preferably a copolymer of ethylene with less than about 10% by weight of an alpha-olefin based upon the weight of the copolymer. The alpha-olefin can be present in from about 1 to 8% by weight and especially preferred is about 2 to 6% by weight of the copolymer.

The adhesion promoting ionomer resins are well known in the art and may be characterized as metal-containing ionic copolymers obtained by the reaction between ethylene or an alpha-olefin with an ethylenically unsaturated monocarboxylic acid, such as, acrylic or methacrylic acid, wherein at least 10% of said carboxylic acid groups are neutralized by an alkali metal ion or zinc ion. Such ionomer resins are disclosed in U.S. Pat. No. 3,496,061, the disclosure of which is incorporated herein by reference. The ionomer resin is present in from about 5% to about 25% by weight of said first layer. Preferably, the ionomer resin is present in about 10% by weight of the first layer so that the weight ratio is approximately 9:1. It is preferred that the ionomer contain either a sodium or zinc ion. The ionomer functions primarily in promoting the adhesion of the first layer to the polyamide layer. The metal salts of a fatty acid contemplated by the present invention can be any one or a mixture of alkali metal, alkaline earth metal or zinc salts of a $C_{12}$–$C_{18}$ fatty acid. Calcium and/or zinc salts of stearic acid are preferred.

While it is acknowledged that stearic acid and certain zinc salts have been employed on the surface of organic films, in order to take advantage of their lubricating characteristics and prevent blocking between the surfaces of contacting polymer films, it has been found that the homogeneous or uniform dispersion of the above mentioned metal salts throughout the first layer of the subject laminar films unexpectedly promotes effective heat sealing of the first layer of the structure to itself. Thus, with a heat sealing proportion of such a metal salt within said first layer, seals that are formed from a face to face heat seal of the first layer are significantly stronger and noticably free of voids in the seal area. It has been found that generally an adhesion promoting proportion is from about 1000 to about 7500 parts per million of said first layer. A more preferred range is from about 1500 to about 5000 per million and a particularly prefered proportion is about 2000 parts per million of said first layer.

The second or polyamide layer of the present invention is preferably a nylon. The nylons contemplated include both those prepared by condensation of a dibasic acid and a diamine and those formed by polymerization by addition reactions of amine compounds that contain both acid and amine groups on the monomer. Examples of the first type are nylon-6/6, nylon-6/9, nylon-6/10 and nylon-6/12. An example of nylon polymerized by the addition reaction of ring compounds and, which is particularly preferred is nylon-6, polymerized from e-caprolactam to form polycaproamide.

While there is no real limit to the thickness of the laminar film, a preferred range is from about 0.5 to about 10 mils, preferably from about 0.75 mils to about 5 mils. Composite film for food bag use will be from 0.8 to 1.5 mils thick.

The ratio of the polyamide layer to the polyolefin layer, expressed in a percent by weight, is from about 5 to 20% by weight of the polyamide layer to 80 to 90% by weight of the polyolefin layer. It is preferred that the polyamide layer be approximately 10% by weight of the overall composite. The preferred high density polyethylene is a copolymer of ethylene with less than 10% by weight of an alpha-olefin based upon the copolymer. The contemplated alpha-olefins are those having from about 3 up to about 10 carbon atoms. Particularly preferred are 1-butene; 1-hexene, 2-ethyl; 1-hexene; 1-octene; etc.

As indicated above, the laminar thermoplastic structure of the present invention is particularly suited for fabrication into bags suited for the containment of foodstuffs to be heated to a preparation temperature. These bags are generally defined by a structure resulting from folding the film to form a generally U-shaped trough and then side sealing both ends of the trough to form a simple bag or pouch. In use, the consumer will place food to be prepared, or to be reheated, inside of the pouch and close the top by some suitable means, for example a twist tie means. In forming a bag of this type, the polyolefin layer is positioned so that it is the inner layer of the bag laminate or that surface of the bag which comes into direct contact with the contents thereof. In this arrangement the outer layer will be the nylon film or that surface which comes into direct contact with the cooking or reheating vessel. The outer nylon film layer maintains the inner, more thermally susceptible, polyethylene layer out of contact with the surfaces of the cooling vessel and hence improves the bags ability to withstand higher temperatures. Nylon-6, for example, has a melting or sticking temperature on the order of above 210° C. and is stable and will not stick to the vessel side walls while food stuffs are being reheated therein. The bag containing foodstuffs is intended to be immersed in a fluid such as water during the reheating operation or employed in a microwave oven.

DESCRIPTION OF SPECIFIC EMBODIMENTS

A tubular thermoplastic laminate was prepared utilizing conventional blown tubular film coextrusion techniques whereby the material which forms the inner layer was melt mixed in one heated screw extruder and the material which forms the outer layer was melt-mixed in an adjacent heated screw extruder. These materials were then coextruded through a typical die arrangement which permitted the formation of the laminar tube.

Into the first heated screw extruder, was melt-mixed a high density polyethylene-1-octene copolymer, identified by the manufacturer as Alathon 7810, 10% by weight of an ionomer resin, identified by the manufacturer as Surlyn 1652 and 2000 parts per million of calcium stearate based upon the weight of this composition. In the adjacent heated screw extruder was melted nylon-6. The two compositions were coextruded so a to yield a tube having a wall thickness of approximately 1.2 where the outer nylon-6 layer was approximately 0.1 mil thick and the inner layer of the copolymer, the Surlyn and the calcium stearate was approximately 1.1 mils thick.

The continuous laminar tube was subsequently converted into bag structures by collapsing the tube, longitudinally slitting the collapsed tube so as to form a pair of U-shaped film composites, and feeding these members through an FMC Model 106 side seal machine. Simple side sealed pouch bags were formed by melt severing through the U-shaped members.

For comparison purposes an identical film composite was formed with the exception that the calcium stearate was not present in the inner bag layer. In all other respects, the film composite and bag structures were identical.

The resin identified by the manufacturer as Alathon 7810 was an ethylene-1-octene copolymer with a 1-octene content of about 3% by weight. This material had the following typical properties for a 1.25 mil film extruded at a 4.3/1 blow-up ratio:

Density 0.945 g/cc
Melt Index 0.25 g/10 min.
Tensile Yield
  (MD): 3,000 psi
  (TD): 3,100 psi
Elongation (MD): 660%
(2"/min.)(TD): 730%
Secant Modulus
  (MD): 80 M psi
  (TD): 82 M psi
Elmendorf Tear
  (MD): 45 g/mil
  (TD): 247 g/mil
Spencer Impact: 2.8 in. lbs./mil
Dart Drop (26 in.): 115 g/mil
Tear propagation
  (MD): 3.2 Kg force
  ASTM D-2582 (TD): 3.7 Kg force The ionomer, identified by the manufacturer as Surlyn 1652, contains zinc as the major cation and has the following typical average physical properties for a one mil blown film extruded at a 2:1 blow-up ratio:

| Property | FILM PROPERTIES Value | ASTM Test |
| --- | --- | --- |
| Density | .939 g/cc | D1505-68 |
| Melt Index | 4.4 decigm/min | D1238-65T |
| Tensile Strength | 2850 psi | D638-67 |
| Tensile Yield | 1870 psi | D-368-67 |
| Elongation | 580% | D-368-67 |
| Elmendorf Tear | 125/140 g/mil (MD/TD) | D-1922-67 |
| Dart Drop (23") | 220 g/mil | D-1709/67 |

The nylon-6 outer layer was fabricated from a resin identified by the manufacturer as CAPRON 8207 which had the following typical physical properties:
Density: 1.13 g/cc
Tensile YIeld: 11,800 psi (ASTM-P-638)
Deflection Temperature: 140° F. (ASTM-D-648 at 264 psi stress)

It had been found that a significant number of the side seals of prior art bags were developing weak portions with bubbles or pores along the fused bead formed during the seal-melt severing step in the bag formation process. It was discovered that in spite of the known lubricating and anti-stick characteristics of metal salts of fatty acids, such as calcium stearate, when such a metal salt is present in the first layer of the composite, a significantly more uniform and strong side seal is obtained. This is shown by the following comparison where one inch wide strips were cut from bags formed as disclosed above. These one inch wide strips contained a heat seal approximately in the center section thereof at right angles to the one inch dimension. The measuring units employed are percent elongation, which denotes the extent to which the one inch wide strip of film, containing the heat seal, can be elongated before the seal fails. The elongation was measured on a Instron Model No. 1130 tensile testing apparatus.

| Sample No. | Control (No calcium stearate) | Test Comparison (2000 ppm-calcium stearate) |
| --- | --- | --- |
| 1 | 256% | 364% |
| 2 | 225% | 302% |
| 3 | 109% | 342% |
| 4 | 191% | 274% |
| 5 | 191% | 306% |

An examination of the seal of the laminar film containing the calcium stearate showed an extremely uniform, pore and bubble free seal bead. An examination of the control seals showed the presence of pores or voids which apparently permitted the failure of the seal to occur at a significantly lower elongation point than with the seals containing the calcium stearate.

While the specific examples show the use of a particular ethylene/alpha-olefin copolymer, it is understood that other copolymers within the indicated density range can be employed. For instance, an ethylene/hexene copolymer having a density of 0.939 g/cc, and available from the manufacture under the name Marlex HHM TR-130, also can be employed. Likewise, other ionomer resins such as SURLYN 1905, having a density of 0.94 g/cc and a zinc ion can be employed.

Although the present invention has been described with reference to preferred embodiments, it is to be understood that modifications and variations may be resorted to without departing from the spirit and scope of this invention. Such modifications and variations are considered to be within the purview and scope of the appended claims.

What is claimed is:

1. A heat sealable film laminate comprising a first layer comprising a major amount of a high density polyolefin, a minor amount of an adhesion promoting ionomer and a heat seal promoting proportion of a metal salt of a fatty acid; and a second layer adhering to said first layer, said second layer comprising a polyamide.

2. The laminate of claim 1 wherein said polyolefin is a polyethylene polymer having a density of from about 0.930 to about 0.960 g/cc, said minor amount is from about 5% to about 25% by weight of said first layer and said polyamide is a nylon.

3. The laminate of claim 2 wherein said polyethylene polymer is a copolymer of ethylene and less than 10% by weight of an alpha-olefin based on said copolymer.

4. The laminate of claim 3 wherein the alpha-olefin has from about 3 to about 10 carbon atoms.

5. The laminate of claim 4 wherein the alpha-olefin is a member selected from the group consisting of 1-butene; 1-hexene, 2-ethyl; 1-hexene and 1-octene.

6. The laminate of claim 1 wherein said metal salt of a fatty acid is at least one member selected from the group consisting of alkali metal, alkaline earth metal and zinc salts of a $C_{12}$–$C_{18}$ fatty acid.

7. The laminate of claim 6 wherein said metal salt is a member selected from the group consisting of calcium and zinc salts of a $C_{12}$–$C_{18}$ fatty acid.

8. The laminate of claim 7 wherein said salt is a member selected from the group consisting of calcium and zinc stearate.

9. The laminate of claim 7 wherein said salt is calcium stearate.

10. The laminate of claim 1 wherein said adhesion promoting proportion is from about 1000 to about 7500 parts per million of said first layer.

11. The laminate of claim 10 wherein said adhesion promoting proportion is from about 1500 to about 5000 parts per million of said first layer.

12. The laminate of claim 11 wherein said adhesion promoting proportion is about 2000 parts per million of said first layer.

13. The laminate of claim 1 wherein said polyolefin is a copolymer of ethylene and a member selected from the group consisting of 1-butene; 1-hexene, 2-ethyl; 1-hexene and 1-octene; said ionomer is a metal-containing ionic copolymer of an olefin and an ethylenically unsaturated monocarboxylic acid; and said polyamide is nylon-6.

14. A laminar thermoplastic bag, particularly suited for the containment of foodstuffs to be heated to a preparation temperature, which comprises a first layer comprising a major amount of a high density polyolefin, a minor amount of an adhesion promoting ionomer and a heat seal promoting proportion of a metal salt of a fatty acid; a second layer adhering to said first layer and comprising a polyamide; and wherein said bag includes a heat seal between contacted faces of said first layer along at least one edge region of said bag.

15. The bag of claim 14 wherein said polyolefin is a polyethylene polymer having a density of from about 0.930 to about 0.960 g/cc, said minor amount is from about 5% to about 25% by weight and said polyamide is a nylon.

16. The bag of claim 15 wherein said polyethylene polymer is a copolymer of ethylene and less than 10% by weight of an alpha-olefin based on said polymer.

17. The bag of claim 16 wherein the alpha-olefin has from about 3 to about 10 carbon atoms.

18. The bag of claim 17 wherein said alpha-olefin is a member selected from the group consisting of 1-butene; 1-hexene; 2-ethyl; 1-hexene and 1-octene.

19. The bag of claim 14 wherein said metal salt of a fatty acid is at least one member selected from the group consisting of alkali metal, alkaline earth metal and zinc salts of a $C_{12}$–$C_{18}$ fatty acid.

20. The bag of claim 19 wherein said metal salt is a member selected from the group consisting of calcium and zinc salts of a $C_{12}$–$C_{18}$ fatty acid.

21. The bag of claim 20 wherein said salt is a member selected from the group consisting of calcium and zinc stearate.

22. The bag of claim 21 wherein said salt is calcium stearate.

23. The bag of claim 14 wherein said adhesion promoting proportion is from about 1000 to about 7500 parts per million of said first layer.

24. The bag of claim 23 wherein said proportion is from about 1500 to about 5000 parts per million of said first layer.

25. The bag of claim 24 wherein said proportion is about 2000 parts per million of said first layer.

26. The bag of claim 14 wherein said polyolefin is a copolymer of ethylene and a member selected from the group consisting of 1-butene; 1-hexene, 2-ethyl; 1-hexene and 1-octene; said ionomer is a metal-containing ionic copolymer of an olefin and an ethylenically unsaturated monocarboxylic acid; and said polyamide is a nylon.

* * * * *